United States Patent [19]
Lavoie et al.

[11] Patent Number: 5,277,807
[45] Date of Patent: Jan. 11, 1994

[54] SEAL FOR SEPARATION DEVICE

[75] Inventors: Catherine A. Lavoie, Westminster, Mass.; Yves Gaignet, Montigny Le Bretonneux, France

[73] Assignee: Millipore Corporation, Bedford, Mass.

[21] Appl. No.: 871,870

[22] Filed: Apr. 21, 1992

[51] Int. Cl.⁵ ............................................. B01D 63/00
[52] U.S. Cl. ......................... 210/321.74; 210/321.83; 210/440; 210/232
[58] Field of Search ............. 210/321.6, 321.61, 321.8, 210/451, 232, 450, 453, 257.2, 440, 321.76, 321.78, 321.85, 321.86, 323.2, 321.74, 321.83, 493.4

[56] References Cited

U.S. PATENT DOCUMENTS

| | | | |
|---|---|---|---|
| 3,225,929 | 12/1965 | Sicard | 210/453 |
| 3,282,434 | 11/1966 | Pall | 210/453 |
| 3,675,777 | 7/1972 | Heskett et al. | 210/232 |
| 3,966,614 | 6/1976 | Bray | 210/450 |
| 4,070,280 | 1/1978 | Bray | 210/450 |
| 4,283,289 | 8/1981 | Meyst et al. | 210/450 |
| 4,309,287 | 1/1982 | Roos et al. | 210/323.2 |
| 4,548,714 | 10/1985 | Kirwary, Jr. et al. | 210/451 |
| 4,594,161 | 6/1986 | Goto | 210/433 |
| 4,600,512 | 7/1986 | Aid | 210/321.83 |
| 4,746,430 | 5/1988 | Cooley | 210/321.76 |
| 4,781,830 | 11/1988 | Olsen | 210/321.83 |
| 4,842,736 | 6/1989 | Bray et al. | 210/321.61 |
| 4,872,990 | 10/1989 | Van Wisk | 210/321.83 |
| 4,906,372 | 3/1990 | Hopkins | 210/321.83 |
| 5,128,037 | 7/1992 | Pearl et al. | 210/321.83 |

FOREIGN PATENT DOCUMENTS 251620  1/1988  European Pat. Off. ........ 210/321.83

Primary Examiner—Robert A. Dawson
Assistant Examiner—Ana M. Furturia
Attorney, Agent, or Firm—Andrew T. Karnakis; Paul J. Cook

[57] ABSTRACT

A spiral wound liquid separation device enclosed within a housing and a cover for the housing is provided with a seal which separates liquid feed to the device from liquid retentate produced by the device. The seal is of unitary construction with one end sealed to the outside surface of the spiral wound separation device and with a second end positioned between the housing and the cover under compression.

6 Claims, 2 Drawing Sheets

SEAL FOR SEPARATION DEVICE

BACKGROUND OF THE INVENTION

This invention relates to a sealing means for a spiral wound filtration apparatus such as in reverse osmosis or ultrafiltration apparatus.

At the present time, liquid separation apparatus such as filtration or reverse osmosis apparatus including a spiral wound cartridge are utilized in separation processes for liquids. The spiral wound cartridge is formed by interleaving one or more membrane layers, one or more spacer layers and one or more liquid impermeable layers about a central hollow core which functions as an outlet for permeate. The cartridge includes a sealing configuration which prevents admixture of permeate with either feed or retentate. The cartridge is positioned within a housing wherein feed is introduced axially into the cartridge, retentate is removed axially from the cartridge and permeate is recovered by way of the central hollow core which is in fluid communication with a fluid outlet in a cover which also seals the cartridge within the housing. At the present time, the feed is sealed from the retentate by a chevron-shaped elastomeric seal which is interposed between the outside surface of the cartridge and the inside surface of the housing for the cartridge in a manner to seal the feed inlet from the retentate outlet. An O-ring, spaced apart from the chevron-shaped seal, is positioned between the cover for the housing and the housing to prevent feed leakage from the housing prior to its being passed through the spiral wound cartridge. Unfortunately, the chevron-shaped seal has a tendency to fail under the normal operating conditions of pressure and fluid flow primarily due to incomplete sealing at the inside wall of the housing and the seal surface contacting the inside wall of the housing.

U.S. Pat. No. 4,594,161 describes a seal structure for a reverse osmosis apparatus wherein a seal is effected between a housing for a spiral wound cartridge and a cover for the housing.

Accordingly, it would be desirable to provide a sealing means which prevents a feed liquid from by-passing a liquid separation means prior to being removed as retentate. Such as sealing means would permit more efficient liquid separation processes which utilize a spiral wound separation cartridge.

SUMMARY OF THE INVENTION

The present invention provides a seal for use in conjunction with a spiral wound liquid separation device which includes a filtration membrane such as an ultrafiltration membrane or a semipermeable reverse osmosis membrane. The spiral wound separation device is positioned with a housing, and a cover for the housing that cooperates with the housing and the seal to effect desired fluid flow through the separation device. The seal prevents admixture of a feed liquid to be passed through the separation device and retentate liquid removed from the separation device. One end of the seal is adhered to the outside surface and about the entire circumference of the spiral wound separation device adjacent a fluid inlet within a cover. A second end of the seal is positioned between a top surface of the housing and the cover. The seal prevents incoming liquid feed to by-pass the separation device prior to being removed from the housing. The second end of the seal preferably has a generally O-ring shaped cross section and is maintained in a sealing relationship between the cover and the housing under a compressive force.

DESCRIPTION OF SPECIFIC EMBODIMENTS

Figure 1:
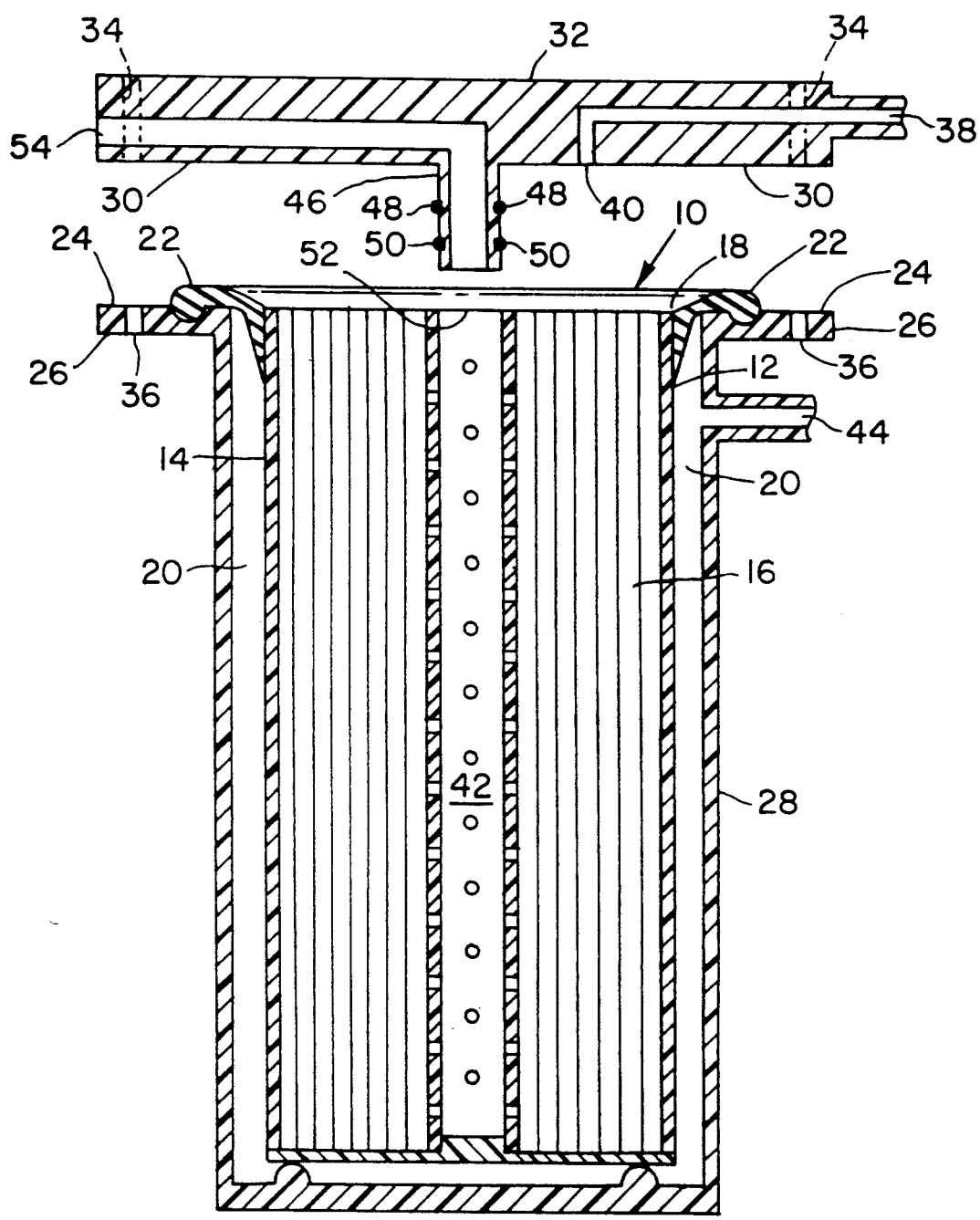
FIG. 1 is a cross-sectional view of a liquid separation apparatus utilizing the seal of the invention.
Figure 2:
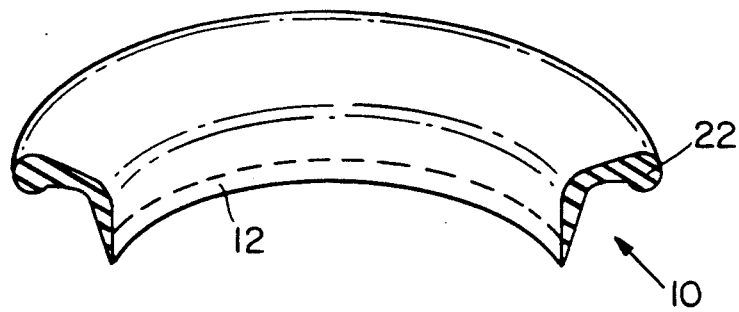
FIG. 2 is an isometric view in cross section of the seal of this invention.

The seal of this invention is useful in conjunction with spiral wound liquid separation devices such as are utilized in reverse osmosis or ultrafiltration. Examples of spiral wound liquid separations devices are disclosed in U.S. Pat. Nos. 3,966,616; 4,548,714; 4,842,736 and 4,906,372 which are incorporated herein by reference. The separation device is enclosed within a housing and a cover for the housing. The seal of this invention seals a feed liquid from a retentate liquid and also seals feed liquid, retentate liquid and permeate liquid from the environment surrounding the liquid separation device utilizing the seal. The seal is of unitary construction and has a first surface adhered to an outside surface of the spiral wound liquid separation device and has a free end positioned between the housing and the cover under a compressive force. In a preferred form of the invention, the free end of the seal has an essentially O-ring cross section.

Referring to the figures, the seal 10 of this invention is formed of a unitary construction and includes a first end 12 which is adhered to the outside surface 14 of a spiral wound liquid separation device 16. The first end 12 can be adhered by any conventional means such as with an adhesive composition or a tape including an adhesive layer. The first surface 12 is adhered about the entire circumference of the outside surface 14 so that volume 18 is sealed from volume 20. The free end 22 of seal 10 is positioned on the surface 24 of flange 26 of housing 28. The surface 24 can include a recess to accommodate a portion of the cross-section of the free end 22 of the seal 10. The free end 22 is positioned between the surface 24 of the housing 28 and the surface 30 of the cover 32 such as with conventional nuts and bolts extending through pathways 34 and 36. The cover is provided with a feed inlet 38 and a feed outlet 40 so that feed can be introduced into the spiral wound liquid separation device 16 which directs permeate into central pathway 42 while retentate is directed into volume 20. Retentate is removed from volume 20 by retentate exit 44. Extension 46 of cover 32 has two O-rings 48 and 50 which effect a seal between the feed inlet 40 and the permeate outlet 52. Permeate is directed through permeate outlet conduit 54 for recovery.

Figure 3:
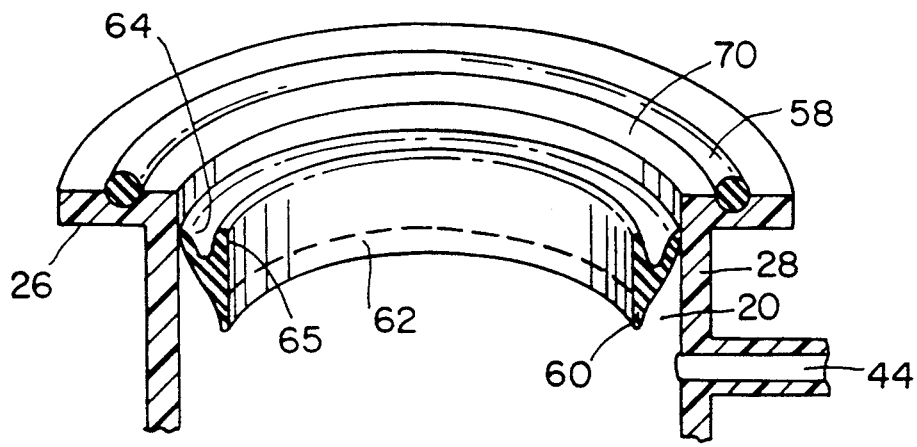
FIG. 3 is an isometric view in cross-section of the sealing arrangement of the prior art.

The sealing means of the prior art is shown in FIG. 3. The sealing means comprises two distinct seals 58 and 60. Seal 58 comprises an O-ring which is positioned between a flap 26 of a housing 28 and is distinct and separated from seal 60. Seal 60 is adhered to the outside surface of a spiral wound liquid separation device (not shown) at area 62. The seal 60 includes two leaves 64 and 65 which expand apart from each other under the pressure of a liquid feed introduced through a cover (not shown) similar to that described above with reference to FIG. 1. The expansion of the leaf 64 against inside surface 70 of housing 28 is intended to effect a seal between feed liquid and retentate liquid in volume 20 which is to be removed through retentate outlet conduit 44. These seals are undesirable since intimate contact between leaf 64 and surface 70 is not always achieved since, for example, the leaf 64 can become fluted under the liquid pressures encountered during use of the apparatus. In addition, the space between leaves 64 and 66 can become a dead space where essentially no liquid flow occurs. This can lead to the undesirable proliferation of microorganisms within the dead space. Therefore, the sealing means shown in FIG. 3 are undesirable.

We claim:

1. Apparatus for separating a fee liquid into a permeate liquid and a retentate liquid which comprises:
   a spiral wound liquid separation device which includes a separation membrane and means for recovering a permeate liquid,
   a housing for said spiral wound liquid separation device,
   a cover cooperating with said housing to enclose said spiral wound liquid separation device,
   means in said cover for introducing said feed liquid into said liquid separation device,
   a seal being of unitary construction and having a first surface adhered to an outside surface of said spiral wound liquid separation device about the circumference of said separation device, said seal having a free end positioned between said housing and said cover,
   said seal being positioned to effect sealing between a feed liquid entering said separation device from an inlet in said cover and a retentate liquid removed from said housing and
   means in said cover for removing a permeate liquid from said separation device while preventing admixture of said permeate liquid with said feed liquid or said retentate liquid.

2. The apparatus of claim 1 wherein said free end of said seal has an essentially O-ring shaped cross-section.

3. The apparatus of claim 2 wherein the spiral wound liquid separation device is a reverse osmosis device.

4. The apparatus of claim 2 wherein the spiral wound liquid separation device is a ultrafiltration device.

5. The apparatus of claim 1 wherein the spiral wound liquid separation device is a reverse osmosis device.

6. The apparatus of claim 1 wherein the spiral wound liquid separation device is a ultrafiltration device.

* * * * *